United States Patent
Silver et al.

(10) Patent No.: US 11,083,544 B1
(45) Date of Patent: Aug. 10, 2021

(54) POWDER COATED MALLEABLE HYDROPHOBIC ORTHODONTIC DEVICE SHIELD

(71) Applicant: OrVance, LLC

(72) Inventors: Michael Edward Silver, Holland, MI (US); Charles Schryver, Atascadero, CA (US)

(73) Assignee: OrVance, LLC, Caledonia, MI (US)

(*) Notice: Subject to any disclaimer, the term of this patent is extended or adjusted under 35 U.S.C. 154(b) by 328 days.

(21) Appl. No.: 16/125,357

(22) Filed: Sep. 7, 2018

Related U.S. Application Data

(60) Provisional application No. 62/555,454, filed on Sep. 7, 2017, provisional application No. 62/555,459, filed on Sep. 7, 2017.

(51) Int. Cl.
  *A61C 7/12* (2006.01)
  *C08J 7/04* (2020.01)

(52) U.S. Cl.
  CPC .............. *A61C 7/125* (2013.01); *C08J 7/0427* (2020.01); *C08J 2383/04* (2013.01); *C08J 2439/06* (2013.01)

(58) Field of Classification Search
  CPC .. A61C 7/125; A61C 7/14; A61C 7/12; A61K 6/90; A63B 71/085; C08J 7/0427; C08J 7/056; C08J 2383/04; C08J 2439/06; C09J 139/06; C09J 133/02; C09D 139/06; C09D 133/02
  USPC ........................................... 128/859; 428/375
  See application file for complete search history.

(56) References Cited

U.S. PATENT DOCUMENTS

| | | | | | |
|---|---|---|---|---|---|
| 4,503,116 | A | * | 3/1985 | Lapidus | B32B 29/02 428/292.7 |
| 4,529,748 | A | * | 7/1985 | Wienecke | A61K 6/35 523/120 |
| 4,801,475 | A | * | 1/1989 | Halpern | C08G 18/08 427/338 |
| 5,700,478 | A | * | 12/1997 | Biegajski | C09J 139/06 424/434 |
| 5,938,435 | A | * | 8/1999 | Raspino, Jr. | A61C 7/12 433/2 |
| 6,447,290 | B1 | * | 9/2002 | Williams | A61C 7/00 433/2 |

(Continued)

OTHER PUBLICATIONS

NuSil MED-4174 Silicone, One Part High Consistent Elastomer—Restricted Medical Use, MatWeb, www.matweb.com/search/datasheettext.aspx?matguid=4e4cdf84847c4806bc411e66e9416a7f. (Year: 2020).*

*Primary Examiner* — Jacqueline T Johanas
*Assistant Examiner* — Shannel Nicole Belk
(74) *Attorney, Agent, or Firm* — Nyemaster Goode, P.C.

(57) ABSTRACT

An orthodontic protection device that includes: an extruded base material having an uncured, uncross-linked silicone high consistency rubber base where the extruded base material has at least one dry, powdered hydrophilic polymeric substance mechanically or frictionally engaged with and dispersed on a surface of the extruded base material thereby forming a finger force malleable hydrophobic base material composite configured to be applied to a surface of a tooth, a surface of an orthodontic appliance or both a surface of a tooth and a surface of an orthodontic appliance using finger pressure within about eight seconds or less.

20 Claims, 12 Drawing Sheets

(56) References Cited

U.S. PATENT DOCUMENTS

| | | | | |
|---|---|---|---|---|
| 8,936,026 B2* | 1/2015 | Hannapel | ............... | A61C 7/125 |
| | | | | 128/859 |
| 9,987,103 B1* | 6/2018 | Hannapel | ............... | A61C 7/125 |
| 10,391,040 B1* | 8/2019 | Schutt | .................... | A61K 6/831 |
| 2009/0087809 A1* | 4/2009 | Jessop | ....................... | A61C 7/00 |
| | | | | 433/24 |
| 2011/0315151 A1* | 12/2011 | Schabert | ................ | A61C 7/125 |
| | | | | 128/859 |
| 2012/0107768 A1* | 5/2012 | DiEdwardo | ............ | A61C 5/007 |
| | | | | 433/136 |
| 2015/0209120 A1* | 7/2015 | Hannapel | ............... | A61C 7/125 |
| | | | | 433/2 |
| 2015/0297550 A1* | 10/2015 | Jay | ....................... | A61K 9/0063 |
| | | | | 514/536 |

* cited by examiner

| Q7-4550 | Q7-4550 Coated | Q7-4550 Coated Wetted | AO Wax | GUM Wax | Dentek Wax | AO Wax (Corrected for Sample Thickness) | GUM Wax (Corrected for Sample Thickness) | Dentek Wax (Corrected for Sample Thickness) | |
|---|---|---|---|---|---|---|---|---|---|
| 46.00 | 5.70 | 26.20 | 0.98 | 0.18 | 0.78 | 0.95 | 0.17 | 0.70 | %T at 350 nm |
| 56.00 | 6.90 | 31.40 | 1.60 | 1.04 | 1.79 | 1.55 | 0.98 | 1.61 | %T at 400 nm |
| 63.30 | 7.65 | 35.00 | 1.85 | 1.25 | 2.09 | 1.79 | 1.18 | 1.88 | %T at 450 nm |
| 68.30 | 8.30 | 37.30 | 2.05 | 1.38 | 2.37 | 1.98 | 1.30 | 2.13 | %T at 500 nm |
| 72.00 | 8.70 | 39.60 | 2.20 | 1.48 | 2.60 | 2.13 | 1.40 | 2.33 | %T at 550 nm |
| 74.80 | 8.90 | 40.20 | 2.32 | 1.56 | 2.90 | 2.24 | 1.47 | 2.60 | %t at 600 nm |
| 76.50 | 9.00 | 40.90 | 2.48 | 1.67 | 3.30 | 2.40 | 1.57 | 2.96 | %T at 650 nm |
| 78.00 | 9.10 | 41.80 | 2.61 | 1.76 | 3.60 | 2.52 | 1.66 | 3.23 | %T at 700 nm |
| 66.86 | 8.03 | 36.60 | | | | 1.94 | 1.22 | 2.18 | Average %T Over Visible Region |
| | | | | | | 34.4 | 55.0 | 30.7 | Q7-4550 is More Clear by this Multiplicative Factor |
| | | | | | | 18.8 | 30.1 | 16.8 | Coated Q7-4550 After Wetting is More Clear by this Multiplicative Factor |
| 1.76 | | | 1.70 | 1.66 | 1.58 | | | | Sample Thickness (mm) |
| | | | | | | | | | Samples Run on a Hitachi U-2910 UV-Vis Spectrometer |
| | | | | | | | | | Percent Transmittance, 700-350 nm, 400 nm/min Scan Rate |

FIG. 18

POWDER COATED MALLEABLE HYDROPHOBIC ORTHODONTIC DEVICE SHIELD

CROSS-REFERENCE TO RELATED APPLICATION

The present application claims priority to and the benefit of U.S. Provisional Patent Application Ser. No. 62/555,454 entitled Powder Coated Malleable Hydrophobic Orthodontic Device Shield, which was filed on Sep. 7, 2017. The present application also claims priority to and the benefit of U.S. Provisional Patent Application Ser. No. 62/555,459 entitled Powder Coated Malleable Hydrophobic Orthodontic Device Shield, which was filed on Sep. 7, 2017, the entire contents of which are hereby incorporated by reference.

BACKGROUND

Certain types of finger force malleable compositions, in particular hydrocarbon based orthodontic wax, have been used by orthodontic patients in an effort to provide relief from pain and irritation due to contact of the oral mucosa with one or more orthodontic hardware such as brackets and wires. The most common finger force malleable compositions are hydrocarbon based wax formulations (often a blend of various hydrocarbon based waxes and fillers) known as Orthodontic Relief Wax (See 10 in FIG. 1). Another type of finger force malleable composition for relief from pain and irritation of orthodontic devices is silicone un-crosslinked high consistency rubber base (understood by those in the art to consist of a proprietary blend of one more silicones with untreated and/or treated silica filler), presently commercialized as ORTHOSIL™. These materials are extremely hydrophobic and completely non-adhering to wet (with water) surfaces. Since saliva is approximately 99.5% water and coats teeth and orthodontic appliances, often pooling within and coating surfaces around orthodontic brackets, orthodontic patients often find it very difficult to get these hydrocarbon and silicone based compositions to adhere and stay in place when applied to their braces. Indeed, the instructions that accompany ORTHOSIL™ state "To use OrthoSil your brackets must be totally dry for the product to adhere properly." Unfortunately this is difficult to accomplish.

An attempt to solve this problem are ORTHODOTS®, sold by OrVance, LLC. These are silicone based compositions. One version employs a polyvinylpyrrolidone (PVP)/glycerin/water solution/formulation sprayed onto the surface of the silicone composition, followed by prolonged heating to evaporate the water and arrive at a surface coated with hardened adhesive beads that render the device adhesive to wet teeth and braces. However, the hardened adhesive beads take at least 10 to 15 seconds to hydrate and develop adhesion upon pressing onto wet teeth and braces, and the beads themselves often come loose from the device in the package before use, potentially rendering the device non-adhesive to wet teeth and braces or causing even longer force to be applied to the device to get them to adhere to the teeth. Another silicone based finger force malleable product invented by the present inventor also has the PVP and glycerin, but the solution is mixed throughout the silicone composition to yield a homogeneous composite. However, due to the dramatic difference in properties between the hydrophobic silicone and the hydrophilic PVP and glycerin, the resulting composite is a bright white color (See 12 in FIG. 1), an attribute that makes the device visually readily obvious to others when worn and thus unsatisfactory to a majority of patients, especially patients worried about personal appearance when wearing the device. Additionally, because the PVP is distributed throughout the silicone, the surface of the device is still majority silicone. The result is the device again takes at least 10 to 15 seconds of finger pressure during application to get it to successfully adhere and stay adhered to wet teeth and braces, and the device sometimes fails to stay adhered due to competitive adhesion to the finger pressing it on to the braces.

SUMMARY

An aspect of the present disclosure is generally directed to an orthodontic protection device that includes: a rod of base material that has at least one of the following compounds chosen from: a product consisting of one or more hydrocarbon-based waxes that may also include inorganic and/or organic fillers; an uncured (uncrosslinked) silicone high consistency rubber base (understood by those practiced in the art to consist of a proprietary blend of one more silicones with untreated and/or treated silica filler); and a hydrophobic water insoluble solid material that is malleable at 37° C. or lower and safe for the human oral environment. The rod of base material has at least one dry, powdered hydrophilic polymeric substance mechanically and/or frictionally engaged with and dispersed on one or more surfaces of the rod thereby forming a finger force malleable hydrophobic base material composite configured to be applied to a surface of a tooth, a surface of an orthodontic appliance or both a surface of a tooth and a surface of an orthodontic appliance using finger pressure within about 8 seconds or less. The surface of the tooth and/or the surface of the orthodontic device, because they are in the mouth, are typically wet with saliva.

Yet another aspect of the present disclosure is generally directed to an orthodontic protection device having: an extruded or otherwise shaped base material comprising at least one of the following compounds: a product consisting of one or more hydrocarbon-based waxes that may also include inorganic and/or organic fillers; an uncured (uncrosslinked) silicone high consistency rubber base; and a hydrophobic water insoluble solid material that is malleable at 37° C. or lower and safe for the human oral environment. The rod of base material has at least one dry, powdered hydrophilic polymeric substance mechanical engaged with and dispersed on one or more surfaces of the rod thereby forming a finger force malleable hydrophobic base material composite configured to be applied to a surface of a tooth, a surface of an orthodontic appliance or both a surface of a tooth and a surface of an orthodontic appliance using finger pressure within about 8 seconds or less. Again, the surface of the tooth and/or the surface of the orthodontic device, because they are in the mouth, are typically wet with saliva.

Another aspect of the present disclosure is generally directed to an orthodontic protection device that includes: an extruded base material having an uncured, uncross-linked silicone high consistency rubber base where the extruded base material has at least one dry, powdered hydrophilic polymeric substance mechanically or frictionally engaged with and dispersed on a surface of the extruded base material thereby forming a finger force malleable hydrophobic base material composite configured to be applied to a surface of a tooth, a surface of an orthodontic appliance or both a surface of a tooth and a surface of an orthodontic appliance using finger pressure within about 8 seconds or less.

BRIEF DESCRIPTION OF THE FIGURES

FIG. 18 shows the percent transmittance of various base materials coated with PVP as the hydrophilic polymeric material. AO (American Orthodontics) wax, GUM™ brand wax, DENTEK™ brand wax were compared along with Dow Corning™ SILASTIC Q7-4550 Medical Grade ETR Elastomer.

DETAILED DESCRIPTION

Figure 1:
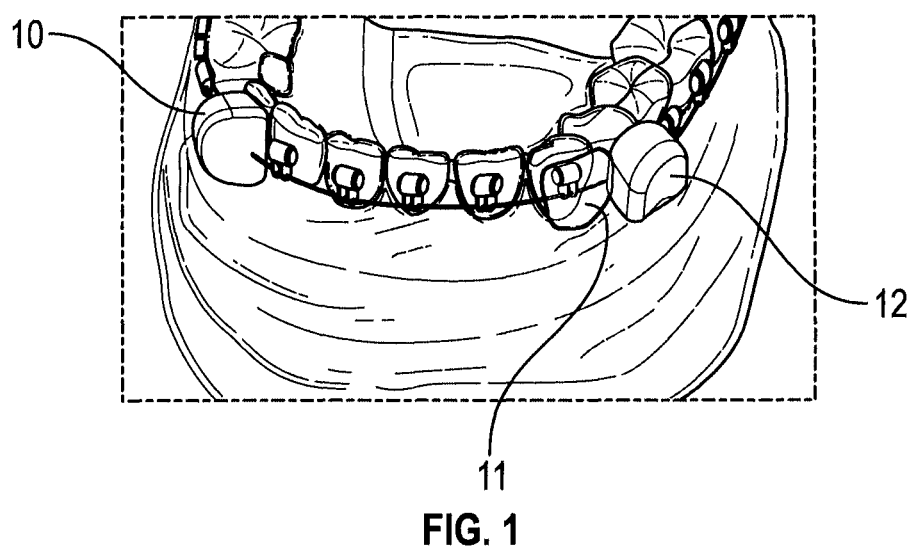
FIG. 1 is perspective view showing three types of orthodontic protection devices, dental wax 10, the clear uncured (uncrosslinked) silicone high consistency rubber base powder coated devices of the present disclosure 11; and prior uncured (uncrosslinked) silicone high consistency rubber base having PVP and glycerin dispersed throughout thereby forming a readily visible white coating material.

The present disclosure generally relates to improved hydrocarbon wax or silicone based finger force malleable hydrophobic materials. The materials are sufficiently sticky towards certain hydrophilic polymeric substances, in dry powder form, such that exposure (contact) of the surface of the finger force malleable hydrophobic material to the powders results in a retained coating of the powders on the hydrocarbon wax or silicone based finger force malleable hydrophobic base. Exposure of the surface or surfaces of the finger force malleable hydrophobic material to the powder may be accomplished in a variety of manners and using manual or mechanical techniques. For example, the powder may be applied to the surface or surfaces by dragging the material through the powder, dropping the powder onto the material either directly or with the aid of mechanical means such as but not limited to some type of powder fed rotating wheel or conveyor or brush, or other mechanical means such as spraying the powder onto the material via use of a simple air-pressurized powder sprayer or an electrostatic powder sprayer. The dry powder on the surface of the hydrocarbon wax or silicone based finger force malleable hydrophobic base forms a dry powder coated finger force malleable hydrophobic material that adheres to wet surfaces such as saliva or water coated teeth and/or orthodontic devices. The dry powder coated base material adheres almost immediately upon finger pressure application to the teeth. Adherence is typically achieved in less than 10 seconds, more typically less than 8 seconds and more typically less than 5 seconds and most typically nearly immediately upon fingertip pressure application to the typical tooth or orthodontic device.

Additionally, the powder coated hydrocarbon wax or silicone based finger force malleable hydrophobic base material composite may be formed by applying, for example by rubbing or pushing the powdered hydrophilic substance(s) into the surface of the malleable hydrophobic material, optionally followed by removing any loose powdered hydrophilic substance(s). The resulting powder coated composite yields a device that: (1) permanently contains a sufficient amount of hydrophilic polymeric substance at the surface (typically only on the surface) of the malleable hydrophobic material such that it is rendered adhesive in nearly instantaneous fashion, upon pushing on with finger pressure, to teeth and orthodontic braces that are wet with saliva; and (2) stays adhered to teeth and orthodontic braces that are wet with saliva for extended periods (for two or more hours).

Applying, which is typically done by rubbing or pushing the dry powdered hydrophilic polymeric substance into the malleable hydrophobic material, may be accomplished by a variety of mechanical means, either separately or in combination, and include a press, a roller, rods, a blade, all of which makes contact with the surface of the malleable hydrophobic material to which the powdered hydrophilic polymeric substance has been deposited. Removing loose dry powdered hydrophilic substance that does not adhere to or is not impregnated into the surface of the malleable hydrophobic material may be accomplished by shaking, brushing, air pressure, or vacuum. Alternatively, upon contact of the dry powdered hydrophilic substance with one or more surfaces of the malleable hydrophobic material, no rubbing or pushing of the dry powdered hydrophilic substance may be done, and no removal of loose dry powdered hydrophilic substance may be done, and the device used as is.

Suitable malleable hydrophobic materials include, but are not limited to: Orthodontic relief Wax (a product consisting of one or more hydrocarbon-based waxes that may also include inorganic and/or organic fillers); uncured (uncrosslinked) silicone high consistency rubber (HCR) base material, which as discussed above is a blend of one more silicones with untreated and/or treated silica filler, or any hydrophobic water insoluble solid material that is malleable at 37° C. or lower and safe for the human oral environment. The uncured (uncrosslinked) silicone high consistency rubber base material incorporates proprietary silicones, proprietary amounts of silicone or silica filler and proprietary silica filter material characteristics. In the industry, this information is kept a trade secret. An "uncured (uncrosslinked) silicone high consistency rubber base material" is a known category of silicone materials to chemists familiar with silicone polymers and/or silicone materials. Regarding the uncured (uncrosslinked) silicone HCR base material, many companies market uncured (uncrosslinked) silicone high consistency rubber base that could be used for inventions of the present disclosure. These include but are not limited to: Wacker ELASTOSIL® R PLUS 4000/50; Wacker ELASTOSIL® R 401/50 S; Wacker ELASTOSIL® R PLUS 4305/70; Wacker ELASTOSIL® R PLUS 4305/60; Wacker ELASTOSIL® R plus 4305/80; Wacker ELASTOSIL® R 401/80 S; NUSIL™ MED-2174; NUSIL™ MED-4174; Dow Corning Silastic Q7-4535 Medical Grade ETR Elastomer; Dow Corning Silastic Q7-4550 Medical Grade ETR Elastomer; Dow Corning Silastic Q7-4565 Medical Grade ETR Elastomer, and Hoshine HS-1552PT High Transparency Extrusion Silicone Rubber. The malleable hydrophobic materially may be extruded or otherwise formed by shaping the material. Other ways of forming the base, malleable, hydrophobic material into a shaped base include, but are not limited to, using a mechanical flat press or a roller press to produce flat sheets that are then coated with the dry powdered hydrophilic polymeric substance(s) and cut into pieces, or pressing the base, malleable, hydrophobic material into a mold, then opening the mold and removing the shaped pieces, which would thereafter be coated with the dry powdered hydrophilic polymeric substance(s) and optionally cut into smaller pieces or shaped, or the powdered hydrophilic polymeric substance(s) could be directly deposited (dusted) onto the mold surfaces as a mold release agent, ending up incorporated onto the surface of the molded piece.

Suitable dry powdered hydrophilic polymeric substances are those that can serve as moisture activated pressure sensitive adhesives and absorb water and are substantially soluble in water. These include, but are not limited to, any material from a list comprising: polyvinylpyrrolidones (PVPs), polyoxazolines, polyethylene glycols, starches, polyacrylic acids, carbomers, polyvinyl alcohols, polyvinyl acetates, cellulose derivatives, polysaccharides (such as xanthan, pectin, guar gum, starches, cellulose ethers, chitosan derivatives), polyacrylamides, N-vinyl caprolactam polymers, and copolymers of methyl vinyl ether and maleic anhydride (PVM/MA), and other water-soluble polymeric adhesives or blends of any of the above or other water-soluble polymeric adhesives. The water-soluble polymeric adhesive(s) are safe for use in the buccal cavity of a human. One particular polyvinylpyrrolidone that may be used is PLASDONE® K-29/32 polymer, which is a stable, water-soluble polyvinylpyrrolidone that meets U.S., European and Japanese pharmacopoeia specifications for povidone.

Additionally, one or more dry powdered flavor substances may be added to the hydrophilic polymeric substances mentioned above to yield a flavor sensation to those using the devices upon application to teeth and orthodontic braces that are wet with saliva. In addition, water soluble (to any extent) compounds that produce a variety of benefits to tooth enamel and oral health in general can be included and mixed with the dry powdered hydrophilic polymeric substance and be delivered in an effective amount and manner over a treatment effective period of time. One or more such compounds may be used. Some of the treatment or benefit inducing compounds that can be included into in a mixture with the dry powdered hydrophilic substance(s) to form the mixture that is applied to a surface of the malleable hydrophobic material include, but are not limited to, the following: sodium fluoride, stannous fluoride, acidulated phosphate fluoride, sodium monofluorophosphate, calcium sulfate, calcium acetate, calcium lactate (with or without addition of xylitol, the combination remineralizes tooth enamel), calcium phosphate, amorphous calcium phosphate complexed with casein phosphopeptides, tricalcium phosphate that has been mechanochemical ball milled with fumaric acid, calcium sulfate, sodium phosphate, potassium phosphate, dipotassium phosphate, and others. Calcium salts and phosphate salts with or without fluoride or carbonate salts may be used. Materials such as calcium chloride, sodium phosphate and sodium fluoride may be placed into non-aqueous mediums and, when they come into contact with saliva, for example, are then re-precipitated as amorphous calcium phosphate, amorphous calcium phosphate fluoride, amorphous calcium carbonate phosphate or amorphous calcium carbonate phosphate fluoride for remineralization of the teeth. The remineralization is further aided by the extended time the composite with the treatment material/components contained therein are applied to the teeth in the context of the present disclosure and their positioning directly around, adjacent and over the braces, which are particular locations where demineralization often occurs when braces are worn. The area around the orthodontic device is particularly treated. In addition, any of the above combination of benefit inducing compounds that lead to precipitate formation in exposed dentinal tubules may be employed for treatment of dentin hypersensitivity.

Additionally, one or more colorants (pigments) that are safe for use in the buccal cavity may be added to the base material to achieve a finger force malleable hydrophobic material of any color. Examples of colorants include but are not limited to Silcogum Blue 243, Silcogum Red 324, and Silcogum Yellow 129, marketed by PolyOne Corporation.

Conceivably, the present dry powdered hydrophilic polymeric substance(s) alone or, as discussed above, in combination with one or more of any of the above mentioned materials, typically the water soluble materials may be mixed or blended together into a mixture/blend to be applied to a surface of one or a plurality of surfaces of the malleable hydrophobic materials. The dry powdered hydrophilic polymeric substance(s) adheres the overall device to a tooth and facilitates delivery of the treatment or tooth benefit material to a surface of one or more of these tooth beneficial materials onto the teeth surfaces or an individual tooth surface that does or does not have an orthodontic device attached thereto and used to apply a delivery method to a tooth for delivery of one or more treatment compositions or compound types whether or not an orthodontic device or devices are present. As with the dry powdered hydrophilic polymeric substance, typically a PVP or mixture of PVPs, due to the water soluble nature of the materials, they hydrate when applied to the surface of the teeth and do not prevent the orthodontic devices of the present invention from becoming at least substantially clear, but more typically clear to the naked eye. Regardless of whether or not these other water soluble components are used, the dry powdered hydrophilic polymeric substance(s) of the present disclosure become at least substantially clear or clear and also typically colorless unless a colorant is added to either the dry powdered hydrophilic polymeric substance including mixture or on the surface of the base material upon hydration by moisture in the air or in the buccal cavity such as when applied to the teeth, tooth or both one or more tooth and one or more orthodontic devices on the tooth. The hydrophilic polymeric substance becomes essentially clear or completely clear within about 10 seconds or less, more typically about 5 seconds or less, 2 seconds or less or even within one second or less after the application of the hydrophilic polymer coated malleable hydrophobic materials to a surface of one or more teeth and/or a surface of an orthodontic device.

Before the subject matter of the present disclosure is described further, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting, instead, the scope of the present disclosure will be established by the appended claims.

Figure 2:
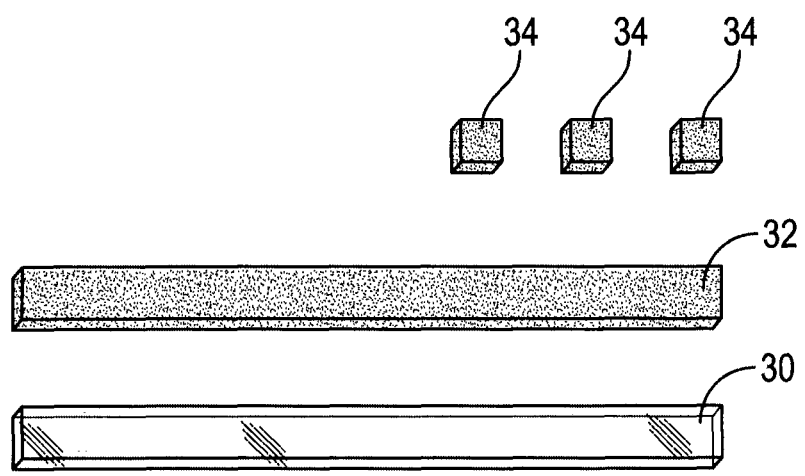
FIG. 2 is a perspective view of the following: an uncoated uncured (uncrosslinked) silicone high consistency rubber base that form the base material in strip form; an uncoated uncured (uncrosslinked) silicone high consistency rubber base material in strip form coated with the dry powder compositions; and the uncured (uncrosslinked) silicone high consistency rubber base in single tooth orthodontic device covering sizes—substantially cubic form.

Example I: Dow Corning SILASTIC® Q7-4550 High Consistency Rubber Base was extruded through a 6 mm×3 mm stainless steel die to produce mostly clear, colorless rectangular rods (See FIG. 2). These rods were adherent to dry surfaces but totally non-adherent to wet (with water) surfaces. Next, an extruded rod was dragged through a dish containing Ashland PLASDONE® K29/32 polyvinylpyrrolidone (PVP) fine white dry powder, coating the rod. Next, excess powder was removed from the surfaces of the rod by brushing it off either with a nylon brush or simply with a finger, resulting in an opaque surface appearance due to the powder coating that adhered to the rod. As shown in FIG. 2, pieces of 6 mm length were cut from the rod, resulting in 3 mm×6 mm×6 mm pieces in which the two 6 mm×6 mm faces and two of the 6 mm×3 mm faces were coated with powdered PVP. When these pieces were applied (pushed on with pressure from a dry finger) to wet teeth in such a manner that one of the coated surfaces made contact with the wet teeth, the piece adhered instantly to the wet tooth and stayed on for three to eight hours, during which time beverages were consumed. Additionally, the piece in contact with the dry finger did not adhere to the dry finger. Additionally, the same adhesive behavior was observed if excess PVP was not brushed off before application to the wet tooth.

Example II: Dow Corning SILASTIC® Q7-4550 High Consistency Rubber Base was extruded through a 6 mm×3 mm stainless steel die to produce mostly clear, colorless rectangular rods. These rods were adherent to dry surfaces but totally non-adherent to wet (with water) surfaces.

Next, the top surface of a rod was textured by rolling a rotary wire wheel over the surface of the rod, producing a multitude of small depressions along the surface.

Next, excess Ashland PLASDONE® K29/32 polyvinylpyrrolidone (PVP) dry powder was deposited onto the textured surface of the rod, the PVP was rubbed into the surface with gentle pressure using a dry finger or the flat surface of a stainless steel spatula or a smooth or textured metal roller, and then excess powder was removed from the surfaces of the rod by brushing it off either with a nylon brush or simply with a finger, resulting in an opaque surface appearance due to the powder coating that adhered to the rod and some white spots due to PVP-filled depressions on the textured surface.

Pieces of 6 mm length were cut from the surface coated rod, resulting in 3 mm×6 mm×6 mm pieces in which the two 6 mm×6 mm faces and two of the 6 mm×3 mm faces were coated with powdered PVP. When these pieces were applied (pushed on with pressure from a dry finger) to wet teeth in such a manner that the coated surfaces made contact with the wet teeth, the piece adhered instantly to the wet tooth and stayed on for three to eight hours, during which time beverages were consumed. Additionally, the piece in contact with the dry finger did not adhere to the dry finger. Additionally, when applied to a wet (with saliva) orthodontic bracket in the mouth, the piece adhered instantly to the wet tooth/bracket and stayed on for nine hours, during which time beverages and foods were consumed. Additionally, the same adhesive behavior was observed if excess PVP was not brushed off before application to the wet tooth. Texturing the surface in any way is completely optional as the device works well if the PVP is pressed into the non-textured surface as well.

Example III: A circular-cross-section rod of American Orthodontic Relief Wax was torn from a package containing five fused rods of wax. The wax rod was adherent to dry surfaces but totally non-adherent to wet (with water) surfaces. Next, Ashland PLASDONE® K29/32 polyvinylpyrrolidone (PVP) fine white dry powder was rubbed into the wax rod with a dry finger or with the flat surface of a stainless steel spatula, coating the rod. Next, excess powder was removed from the surfaces of the rod by brushing it off either with a nylon brush or simply with a finger, resulting in an opaque surface appearance due to the powder coating that adhered to the rod. Pieces of 6 mm length were cut from the rod. When these pieces were applied (pushed on with pressure from a dry finger) to wet teeth in such a manner that one a coated surface made contact with the wet teeth, the piece adhered instantly to the wet tooth and stayed on for three to eight hours, during which time beverages were consumed. Additionally, the piece in contact with the dry finger did not adhere to the dry finger. Additionally, the same adhesive behavior was observed if excess PVP was not brushed off before application to the wet tooth.

Example IV: Dow Corning SILASTIC® Q7-4550 High Consistency Rubber Base was extruded through a 6 mm×3 mm stainless steel die to produce mostly clear, colorless rectangular rods. These rods were adherent to dry surfaces but totally non-adherent to wet (with water) surfaces. Next, an extruded rod was dragged through a dish containing Lubrizol CARBOPOL® 940 Polymer (polyacrylic acid polymer) fine white dry powder, coating the rod. Next, excess powder was removed from the surfaces of the rod by brushing it off either with a nylon brush or simply with a finger, resulting in an opaque surface appearance due to the powder coating that adhered to the rod. Pieces of 6 mm length were cut from the rod, resulting in 3 mm×6 mm×6 mm pieces in which the two 6 mm×6 mm faces and two of the 6 mm×3 mm faces were coated with powdered CARBOPOL® 940. When these pieces were applied (pushed on with pressure from a dry finger) to wet teeth in such a manner that one of the coated surfaces made contact with the wet teeth, the piece adhered instantly to the wet tooth and stayed on for three to eight hours, during which time beverages were consumed. Additionally, the piece in contact with the dry finger did not adhere to the dry finger. Additionally, the same adhesive behavior was observed if excess CARBOPOL® 940 was not brushed off before application to the wet tooth.

Example V: A circular rod of American Orthodontic Relief Wax was torn from a package containing 5 fused rods of wax. The wax rod was adherent to dry surfaces but totally non-adherent to wet (with water) surfaces. Next, Lubrizol CARBOPOL® 940 Polymer (polyacrylic acid polymer) fine white dry powder was rubbed into the wax rod with a dry finger or with the flat surface of a stainless steel spatula or with a smooth or textured metal roller, coating the rod. Next, excess powder was removed from the surfaces of the rod by brushing it off either with a nylon brush or simply with a finger, resulting in an opaque surface appearance due to the powder coating that adhered to the rod. Pieces of 6 mm length were cut from the rod. When these pieces were applied (pushed on with pressure from a dry finger) to wet teeth in such a manner that one a coated surface made contact with the wet teeth, the piece adhered instantly to the wet tooth and stayed on for three to eight hours, during which time beverages were consumed. Additionally, the piece in contact with the dry finger did not adhere to the dry finger. Additionally, the same adhesive behavior was observed if excess CARBOPOL® 940 was not brushed off before application to the wet tooth.

Figure 3:
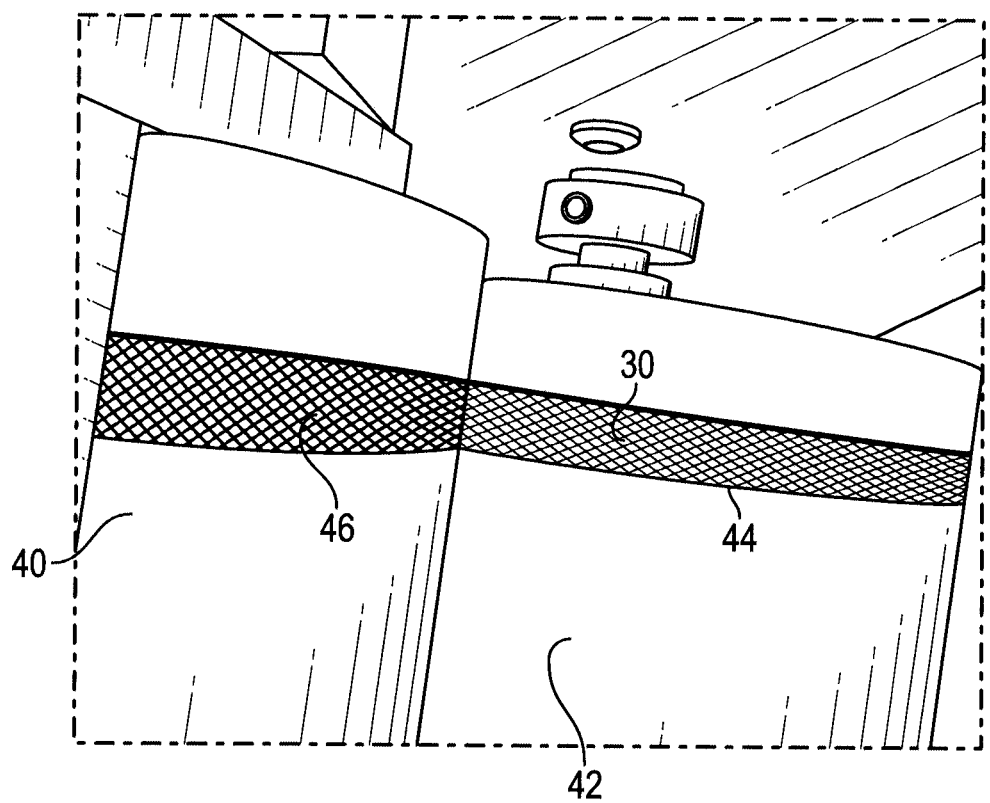
FIG. 3 is a perspective view of two rollers, one feeding the uncured (uncrosslinked) silicone high consistency rubber base material and the other having a knurled or grooved or other textured surface to both optionally create indentations into the base material and also transport the dry powder adhesive material into engagement with the base.
Figure 8:
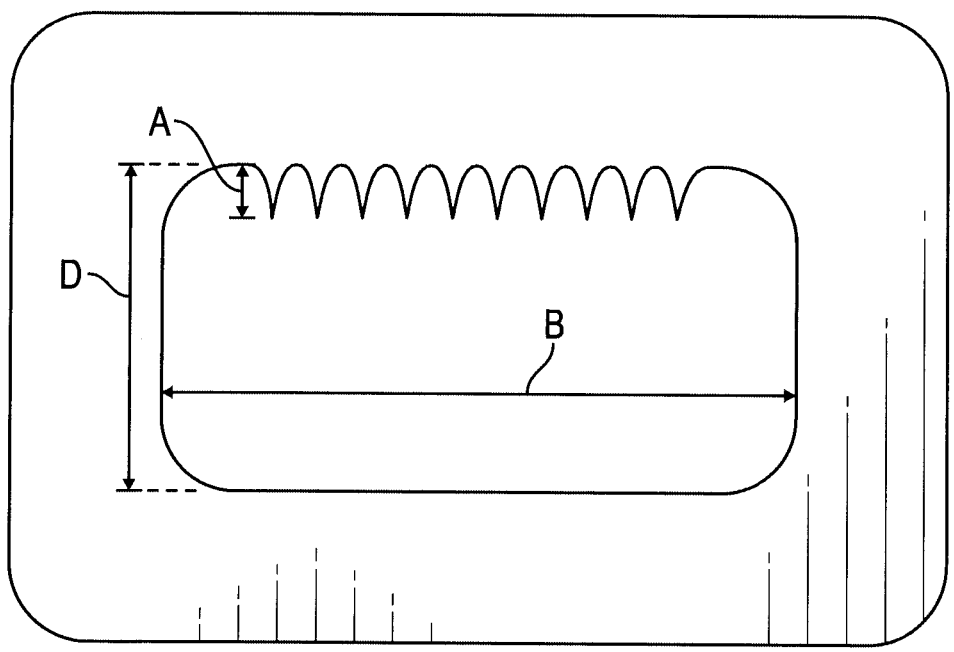
FIG. 8 is a cross-sectional view of an extrusion die opening that has a pattern that would cut/form microgrooves on a single surface of the base material of the present disclosure.

As shown in FIG. 3, the method of applying the dry powder adhesive material of the present disclosure may utilize a knurled or otherwise textured roller 40 and a second roller 42 that has a groove/channel 44 that receives hydrocarbon wax or silicone based finger force malleable hydrophobic base material 30. Notably, while it may do so, the knurled or otherwise textured roller does not typically apply a texture to the extruded base material 30. The textured surface is obtained using a die during the extrusion process (see FIG. 8 and FIG. 12). Instead, the knurled or textured roller utilized the cavities in the roller to hold the dry powder adhesive material before it is applied. If a texturization is made to the base material, this texturization is done as the base material is extruded by extruding the base material through an extrusion die as shown in FIG. 8. The extrusion die has an about 6 mm×about 3 mm shape. The pattern on one surface, the surface to receive the dry powder adhesive, is a series of microgrooves producing projections (A) extending from a side of the die and having a maximum depth of about 0.02 inches, but conceivably the depth could be from about 0.4 to about 0.01 inches. The main purpose of the grooves would be to create substantially V-shaped channels within which the dry adhesive material may be placed as the extruded rod passes through the overall system and the knurled or otherwise textured roller 40 and the second roller 42. Conceivably, the use of a textured roller 40 is unnecessary when the micro-grooved extruded rod of base material is employed, but typically both are utilized to ensure the dry powder adhesive is delivered into the microgrooves. As shown in at least FIG. 3, the two rollers 40, 42 are proximate one another such that the dry powder adhesive material in the textured surface on one side of the base material 30 (the optionally micro-grooved side) is delivered into engagement with the base 30 within the created textured surface 46 or on the flat unmicrogrooved surface of the extruded rod of base material 30. In FIG. 3 and other figures of this application, the textured surface, which would typically have linear (typically V-shaped) grooves consistent with the die shown in FIG. 8, is shown with the adhesive powder applied in the knurled pattern on the base material. However, the grooves typically would be present. This creates a continuous production process.

Figure 4:
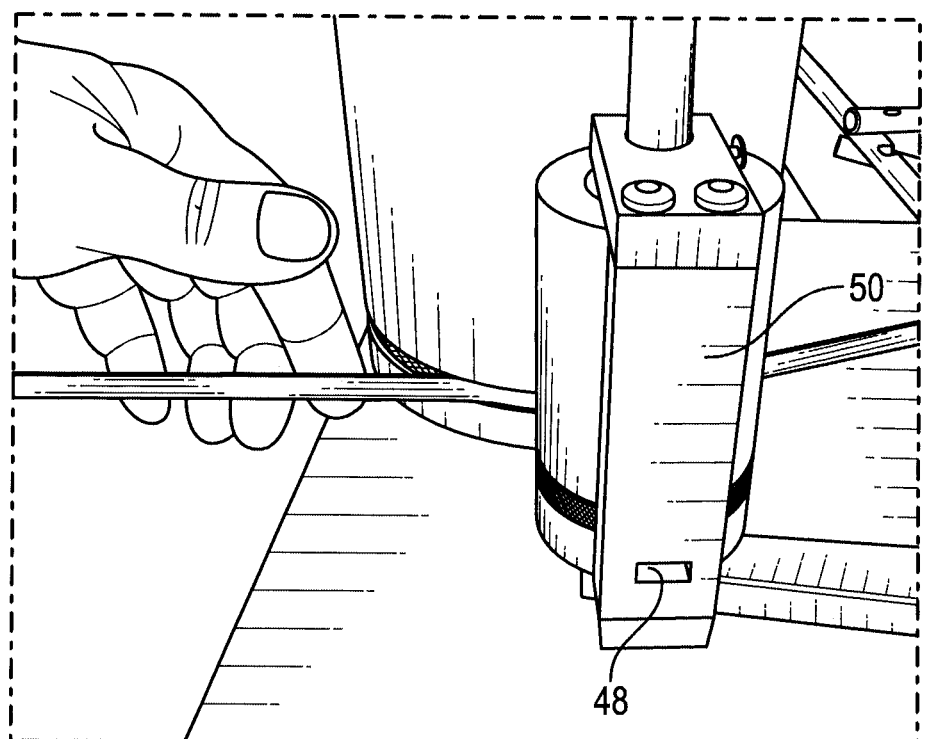
FIG. 4 is an enlarged perspective view of a system of the present disclosure employing a twin roller system to create the products of the present disclosure. In particular the dry powder feed cavity is shown in the guide above the knurled or textured roller to feed dry powder into the textured surface of the roller prior to it being mechanically forced into engagement with the uncured (uncrosslinked) silicone high consistency rubber base material.
Figure 5:
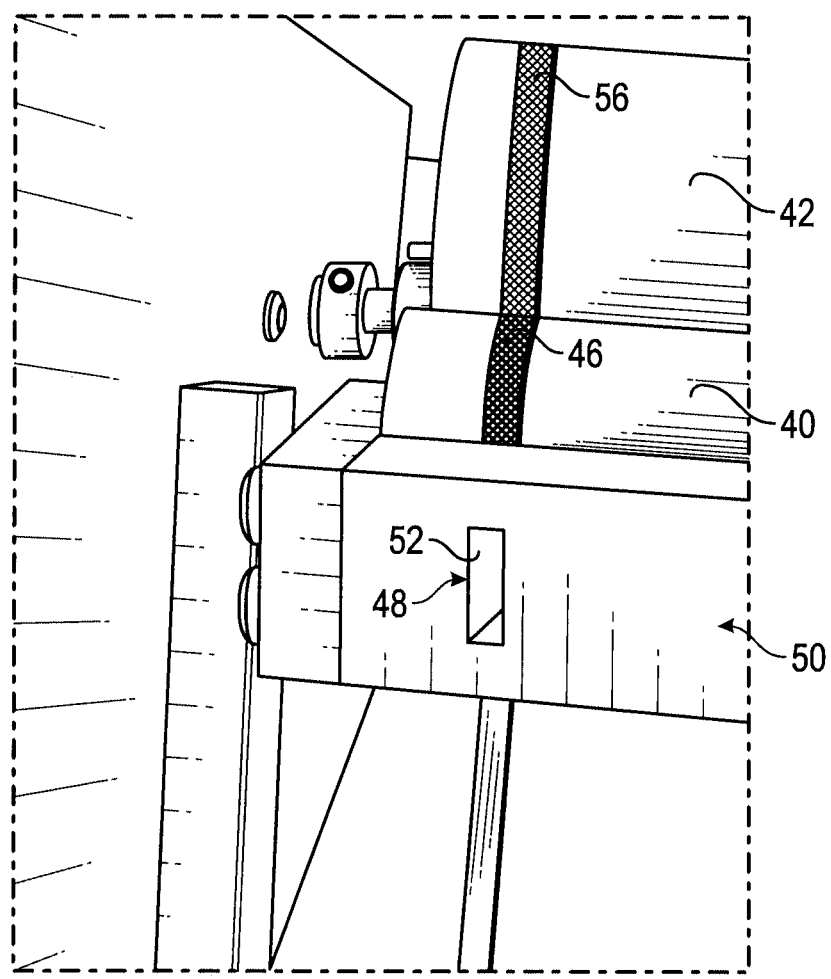
FIG. 5 is an enlarged perspective view of the dry powder feed cavity shown in FIG. 4, but with powder inserted therein.
Figure 6:
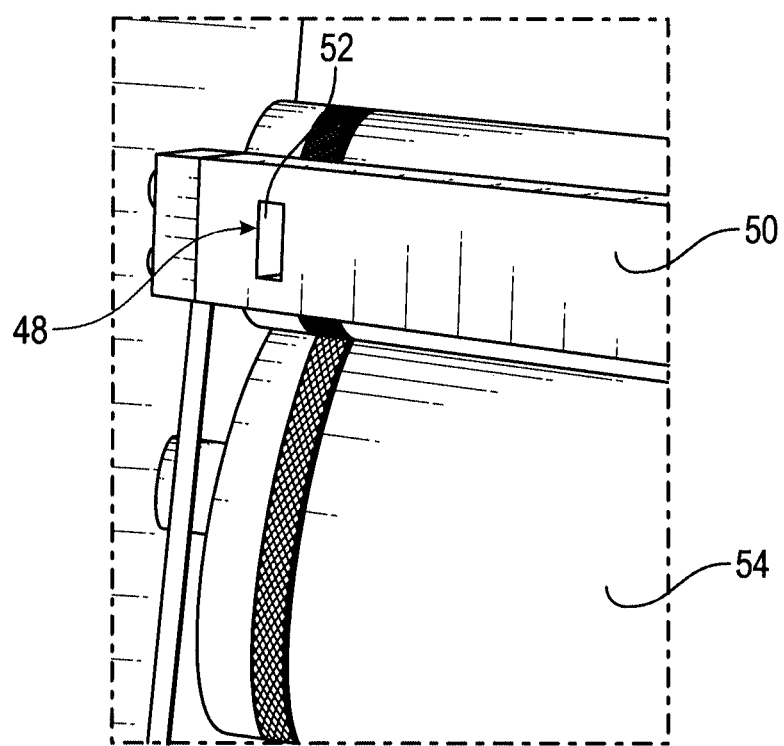
FIG. 6 is an enlarged perspective view of a roller system of the present disclosure with the rollers aligned next to one another with the dry powder feed cavity spaced above the textured surfaced roller and the base delivering roller and the textured roller adjacent laterally with one another.
Figure 7:
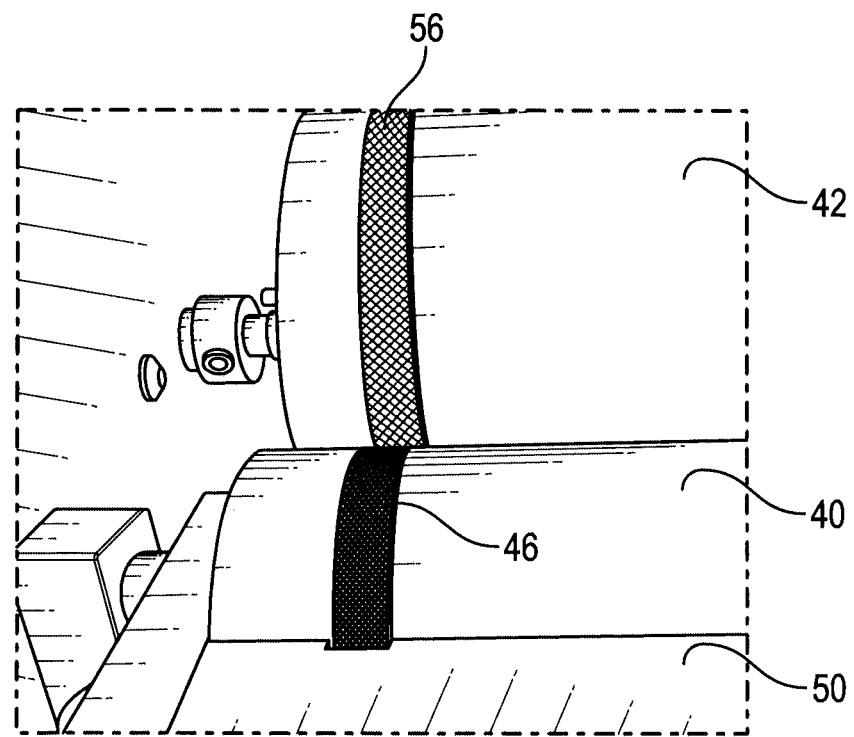
FIG. 7 is an enlarged perspective view of a system of the present disclosure with the textured roller receiving the dry powder and spaced above the uncured (uncrosslinked) silicone high consistency rubber base material delivering roller.

FIG. 4 shows the process for forming the composite material of base 30 and powder engaged to a surface of the composite, but shows the system without the powder inserted into the dry powder feed cavity 48 in the powder guide bracket 50, which is spaced above the textured or knurled roller 40 such that powder is delivered to the grooves of the textured or knurled portion 46 of the roller 40. The roller 42 may be spaced below or adjacent or otherwise in a force receiving engagement with the textured roller 40. FIG. 5 shows the system with the dry powder particles 52 generally shown filled into the dry powder feed cavity 48. FIG. 6 shows the system with a third roller 54 on the feed side of the system to feed the base material 30 into the knurled or textured roller 40. The base material is shown smooth on this side of the system. FIG. 7 shows the other side of the system after the powder is applied and texturizing done to the base material to form the dry powder coated composite orthodontic protection device material 56 of the present disclosure.

FIG. 8 shows a cross-sectional view of the die of the extrusion of the present disclosure. The die forms a plurality, typically about 5 or more, of grooves on a length of the rectangular cross-section. The die shown in FIG. 8 is one version of an extrusion die opening that is roughly 6 mm (B)×3 mm (D) that has a pattern that would be cut into it using EDM (Electric Discharge Machining) wire cutting. The die places microgrooves into the surface of the silicone rod. The microgrooves receive the hydrophilic polymeric substance(s) such as PVP in powder form when it is deposited onto it. This does two things: First, the microgrooves make the surface that has been powdered more obvious to the user. Second, the grooves carry additional amounts of hydrophilic polymeric substance(s) such as PVP. While not necessary for adhesion, the added amounts of the hydrophilic polymeric substance(s) facilitate greater adhesion forces to the surface of the tooth/teeth and/or a surface of a dental appliance or orthodontic device. FIG. 8 shows ten grooves, however, fewer or more grooves may be employed. Typically ten or fewer, more typically five grooves or fewer are used.

The dry powdered hydrophilic polymeric material, such as PVP, when in the open and exposed to ambient humidity, goes from a non-tacky dry white powder to eventually (within 1 month or less depending on ambient humidity and other factors) a clear and colorless solid (almost like glass)

that remains non-tacky during this time of hydration and increasing in mass by approximately 20%. Both the PVP powder—if applied as a powder—and the glass-like solid, when in that form, adhere to wet teeth, orthodontic device or both or a plurality of one or more of each.

Figure 9A:
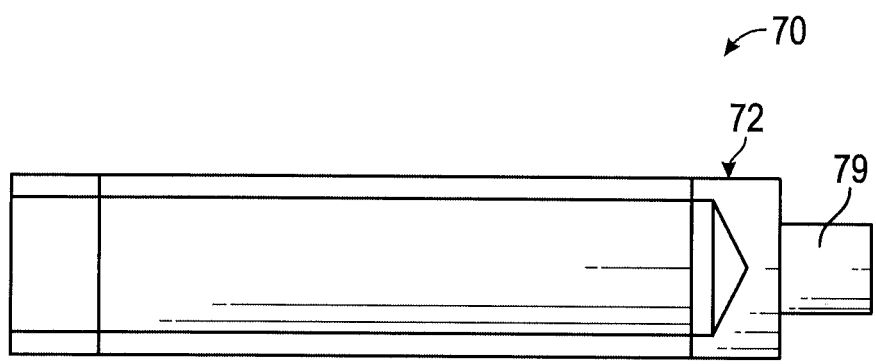
FIG. 9A is an elevated side view showing a cutout location of a urethane rod and a coaxial, swivel bar engaging peg.
Figure 9B:
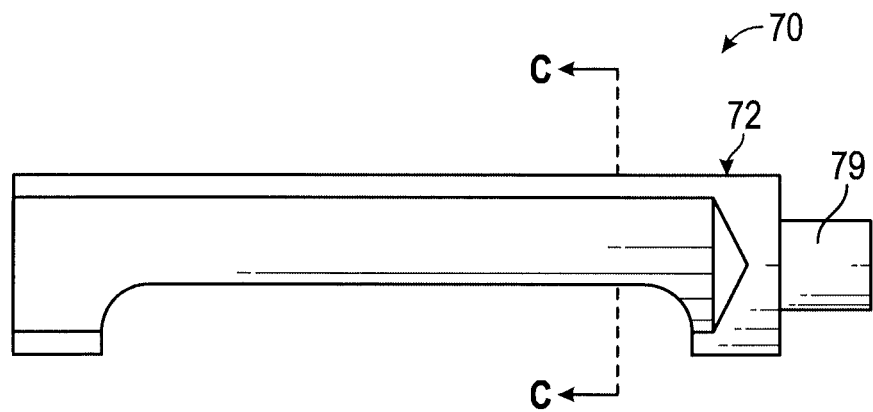
FIG. 9B is an elevated top view showing a cutout location of a urethane rod and a coaxial, swivel bar engaging peg.
Figure 9C:
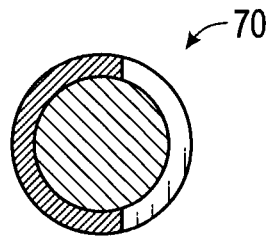
FIG. 9C is a cross-sectional view taken along line C-C in FIG. 9B.
Figure 10:
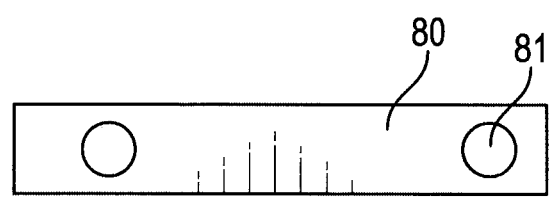
FIG. 10 is an elevated plan view of a swivel bar that holds the urethane rod holder containing a urethane rod therein and allows for adjustable or fixed amount of pressure to be applied to the adhesive and engage it to a surface of the base material.
Figure 11:
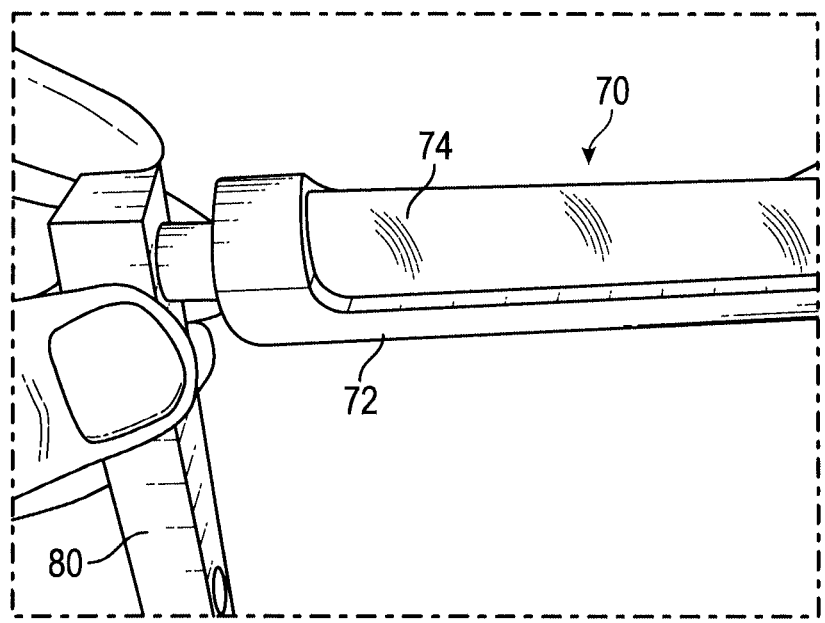
FIG. 11 is a perspective view of the urethane rod, finger pressure simulating force applying device.

An artificial finger pressure application device is typically used during production of the overall orthodontic protection device is typically used to apply a finger pressure amount of from 0.2 psi to about 2 psi and force the dry powdered hydrophilic polymeric material(s) to mechanically adhere to at least one (typically one) surface of the extruded base material. The pressure could be slightly more than fingertip pressure of up to about 4 psi as well. The construction of the artificial finger pressure application device 70 is shown in FIGS. 9-11. The device 70 engages the swivel bar 80 using the mounting peg/projection 79, which is engaged with a receiving aperture 81 in the swivel bar 80. The device 70 has a housing 72 that receives the soft urethane artificial finger 74. The housing has an outwardly extending peg 76 that extends along the longitudinal axis of the device 70 and is removably and rotatably engaged, typically by hand and without the use of tools, with a recess 82 in the swivel bar 80. The device 70 is engaged in the processing line to press the PVP into the extruded silicone rod after the knurled wheel deposits PVP.

Figure 12:
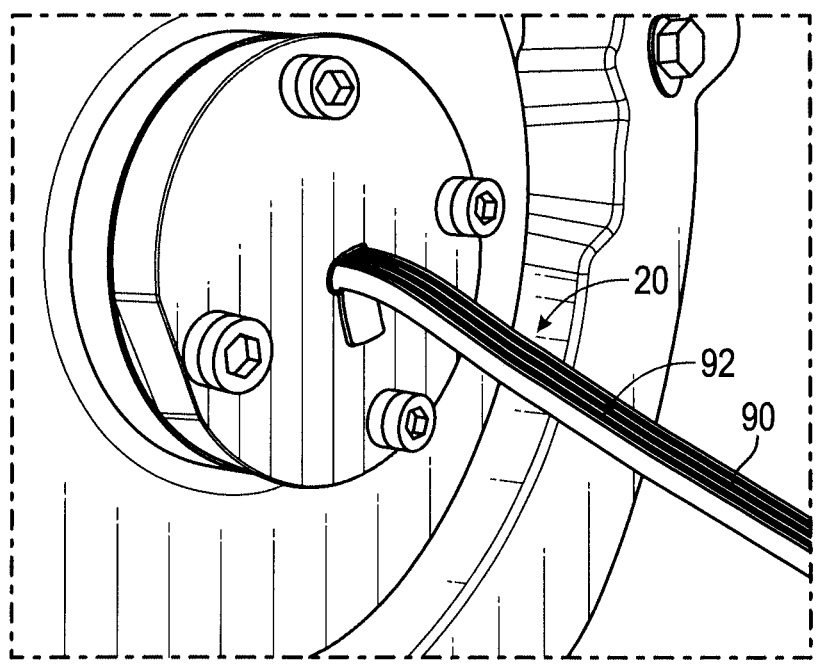
FIG. 12 is a perspective view of the finger force malleable material being extruded to include PVP receiving microgrooves on a top length surface of the base material.
Figure 13:
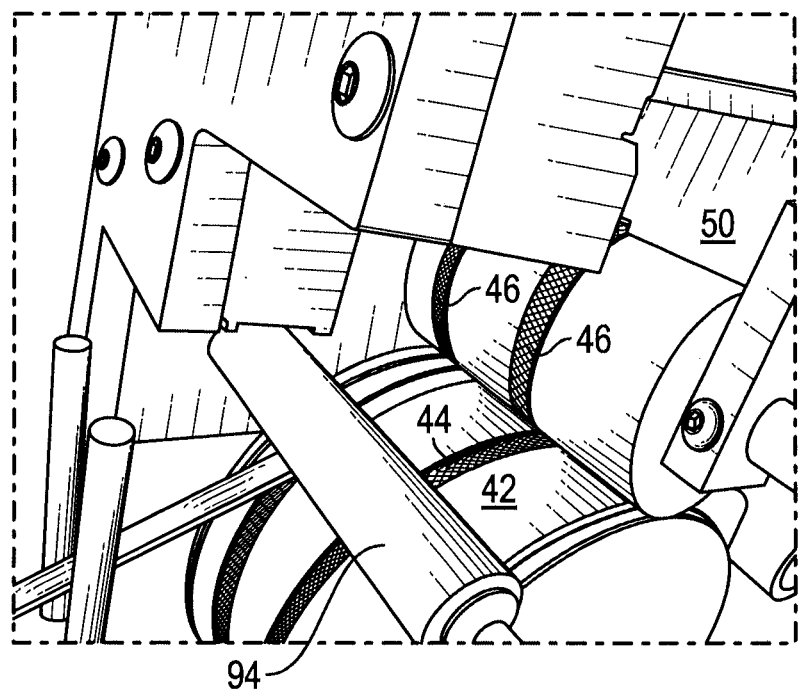
FIG. 13 is a perspective view of the extruded base material entering the application station where hydrophilic polymeric material(s) are applied.
Figure 14:
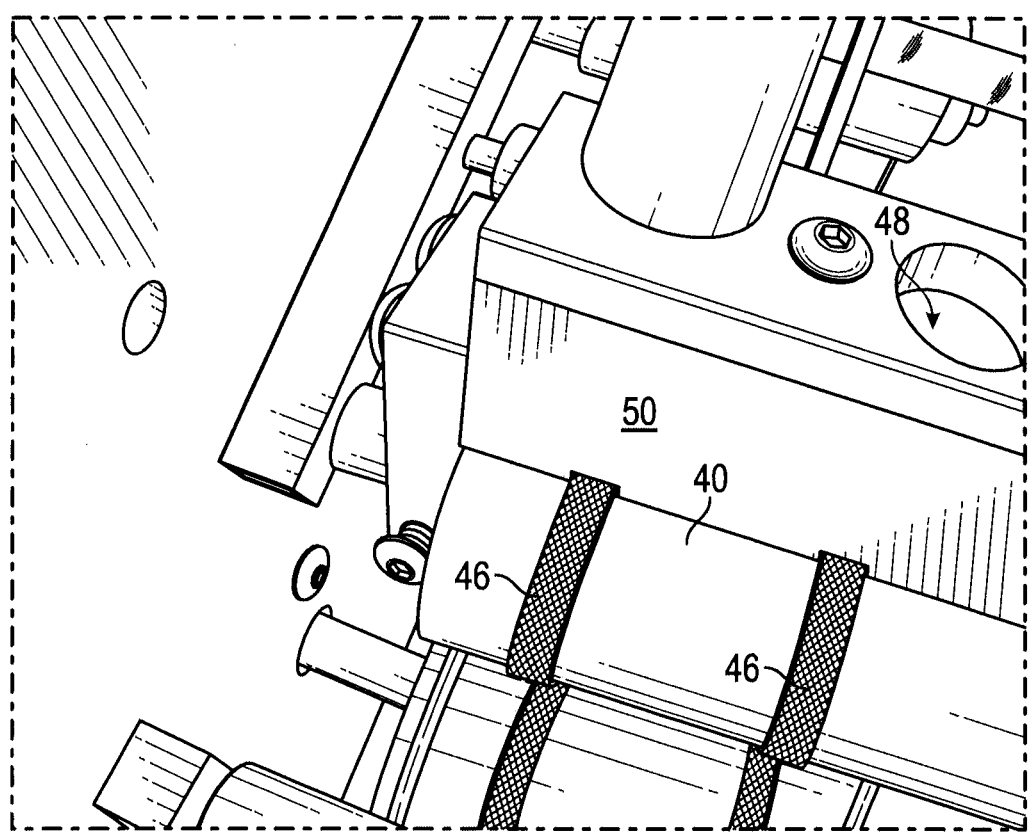
FIG. 14 is a perspective view of the extruded and coated base material departing the application station/system with the hydrophilic polymeric material(s) applied thereto.

FIG. 12 shows a finger force malleable material being extruded to form PVP receiving microgrooves 90 on a top length surface 92 of the base material 20. Once extruded, the base material 20 proceeds to go under a guide roller 94 (See FIG. 13) and into the larger extruded base material receiving roller 42. The grooved base material is fed into the groove(s)/channel(s) 44. As shown in FIGS. 13-14, the base material proceeds such that the PVP and/or other hydrophilic polymeric material(s) is applied, typically by gravity at this stage, onto the top surface of the base material from the knurled portion(s) 46. The PVP and/or other hydrophilic polymeric material(s) are delivered from a funnel or other container spaced above the knurled portion(s) such that the PVP and/or other hydrophilic polymeric material(s) are delivered by gravity through the downspout of the funnel and into the knurled portion(s) which then deliver the PVP and/or other hydrophilic polymeric material(s) to the base material.

Figure 15:
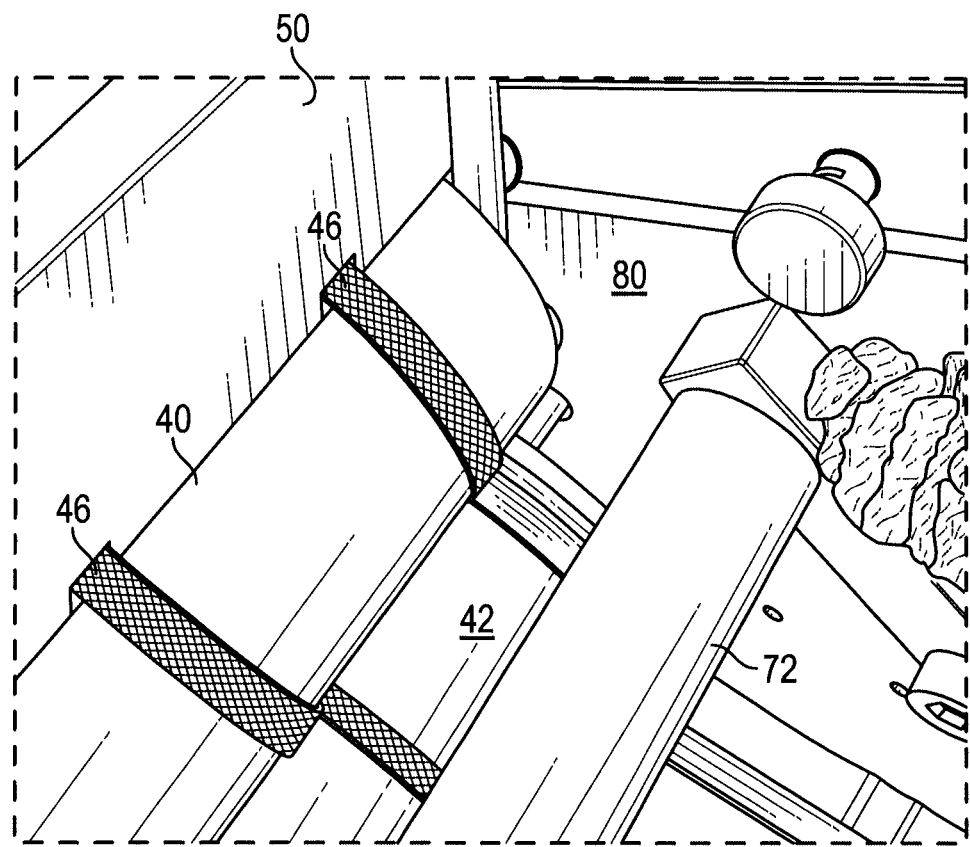
FIG. 15 is a perspective view of the finger pressure applicator system applying pressure to the loose dry hydrophilic polymeric material(s) into frictional engagement with the base material.
Figure 16:
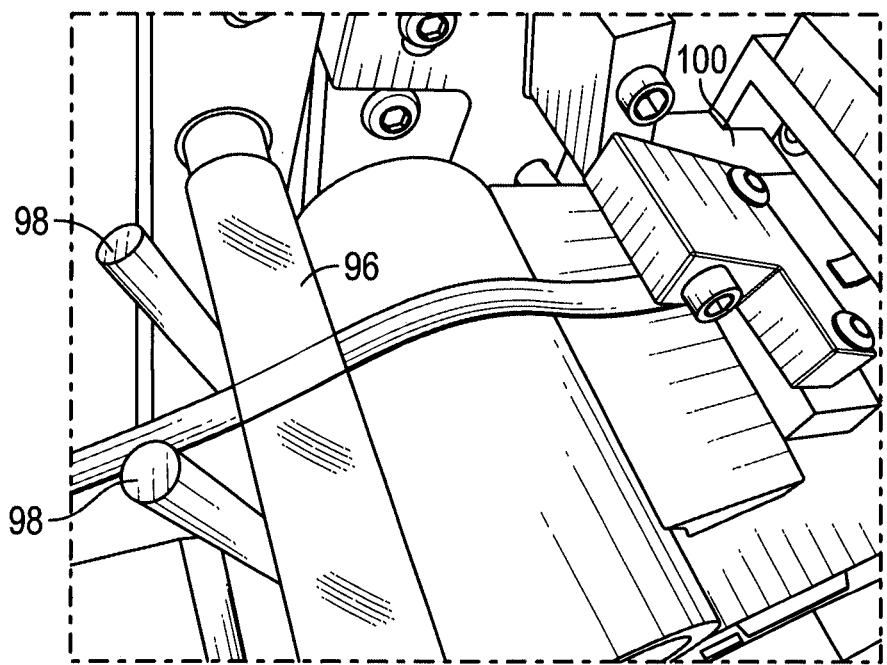
FIG. 16 is a perspective view of the vacuum removal system and guillotine cutting system to make predetermined sized orthodontic protection devices to cover one or more tooth surface and a dental appliance or orthodontic device.
Figure 17:
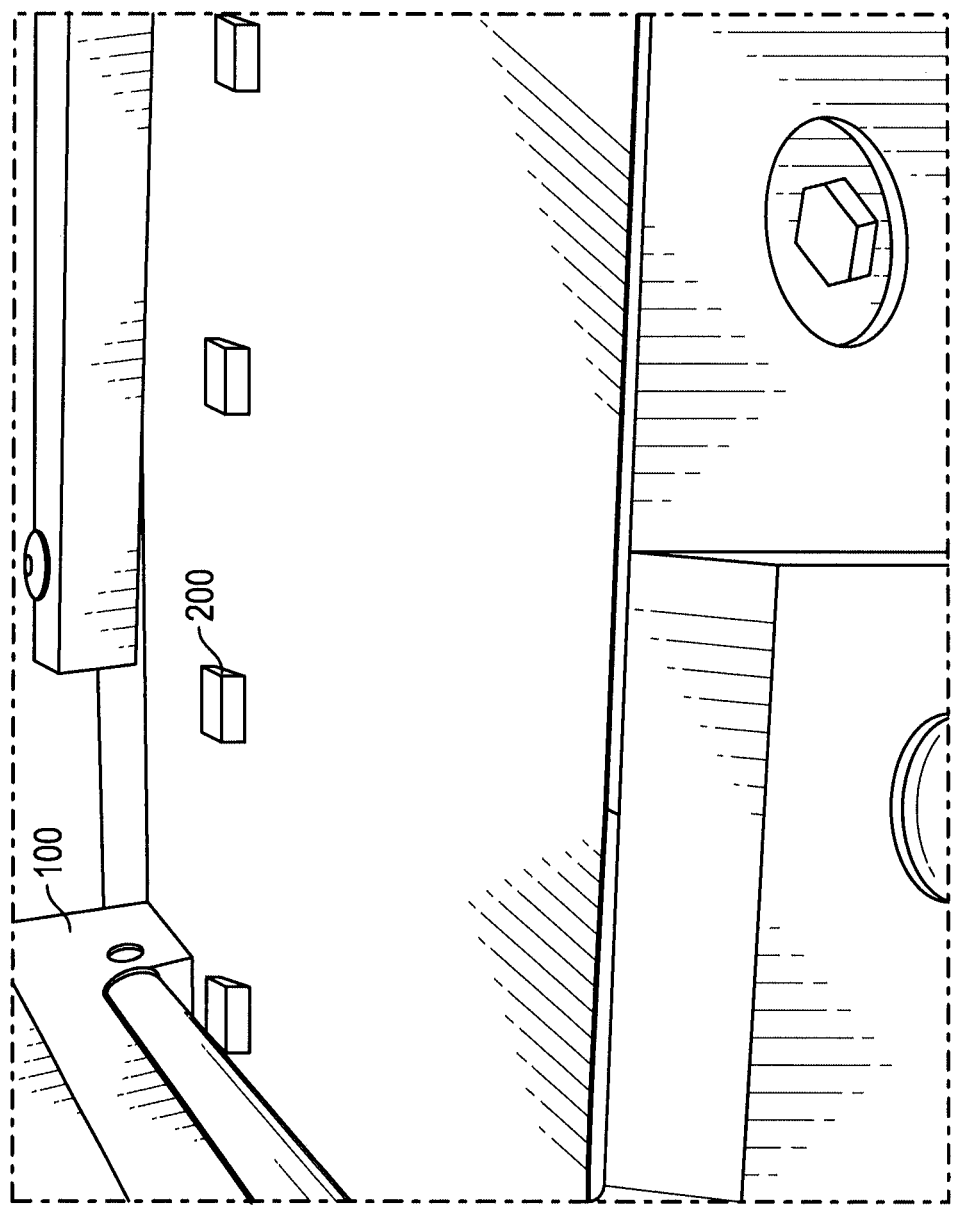
FIG. 17 is a perspective view of the cut and sized orthodontic protection devices traveling along a conveyor belt system to be packaged for use and delivery to the end user. Typically, the devices are packaged in individual tamper evident containers.

As shown in FIG. 15, the PVP and/or other hydrophilic polymeric material(s) coated base material then is guided under the artificial finger pressure application device such that essentially a pressure in the amount of finger pressure (about 0.2 to about 2 psi or less). FIG. 16 shows the coated base material proceeding under a rod 96 and between two guide posts 98. The rod 96 has a vacuum that removes any loose and not frictionally engaged hydrophilic polymeric material(s) from a surface of the base material. Typically, hydrophilic polymeric material(s), such as PVP, are only applied to one surface to make that surface the user evident surface to be applied to the surface of the tooth/teeth/dental device(s). The vacuum helps remove excess hydrophilic polymeric material(s) from other surfaces the material may be loosely connected to. Once applied by the end user, as discussed above the base material and the hydrophilic polymeric material(s) become essentially clear or visibly clear to the naked eye. FIG. 17 shows the cut and sized orthodontic protection devices traveling along a conveyor belt system to be packaged for use and delivery to the end user. Typically, the devices are thereafter packaged in individual tamper evident containers.

FIG. 18 shows the percent transmittance of various base materials coated with PVP as the hydrophilic polymeric material. AO (American Orthodontics) wax, GUM™ brand wax, DENTEK™ brand wax were compared along with Dow Corning™ SILASTIC Q7-4550 Medical Grade ETR Elastomer.

Figure 19:
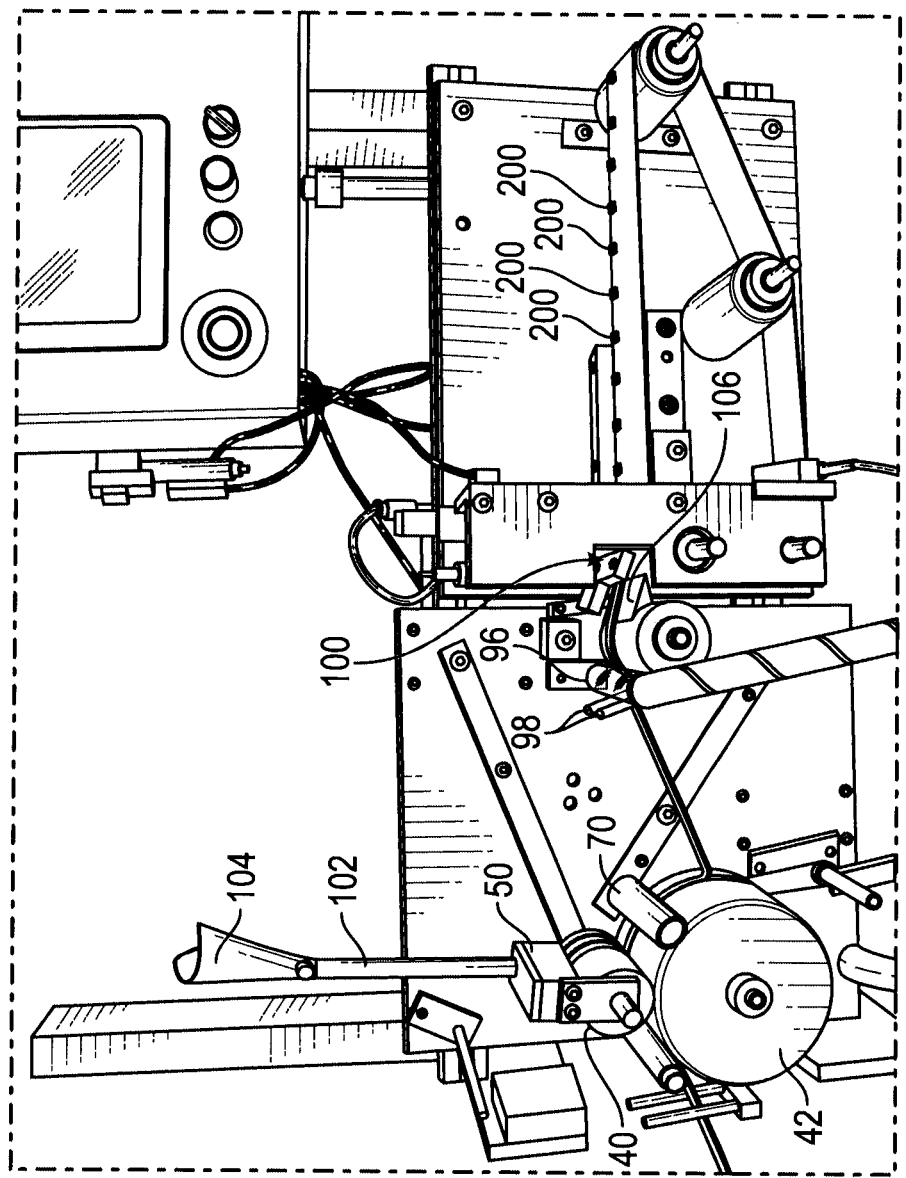
FIG. 19 is a perspective view of an overall assembly system for the production of the powder coated malleable hydrophobic orthodontic device shields of the present disclosure.

FIG. 16 also shows the guillotine cutting system 100 that is used to cut the orthodontic protection devices into a predetermined size for each orthodontic protection device. Typically they are in the form of a "dot" 200 sized to cover one tooth surface and a dental appliance or orthodontic device; however, the devices can be sized to cover a plurality of teeth and orthodontic devices in a manner similar to a mouth guard would protect multiple teeth and the buccal liner facing the teeth and orthodontic device(s). The system typically produces 2 "dots" per second (one "dot" per second from each of two rods), but the system could run at a rate as fast as 2 "dots" per extruded rod per second utilized instead of one or conceivably at slower speeds as well. The system may also run at one "dot" per 0.66 seconds per extruded rod. In FIG. 19, an acrylic clear tube 102 holding the PVP powder (the hydrophilic polymeric material(s)) is shown. Inside and also attached to the acrylic tube 102 will be vibrators (not shown) which actuate, typically at programmable intervals, to make sure the PVP powder (the hydrophilic polymeric material(s)) shakes down into the applicator. The paper fill funnel 104 will be replaced with a real type of funnel. The large white grooved Teflon® 42 roller that holds the extruded rod as it receives PVP powder (the hydrophilic polymeric material(s)) applied (typically dropped) onto it also has an adjustable spring attached to the urethane press bar/device 70, and a white Teflon® scraper 106 below to help remove the extruded rod from the groove in the Teflon roller 42. You can also see two tubes hooked to a vacuum cleaner. The knurled steel roller that fills with PVP powder (the hydrophilic polymeric material(s)) and transfers it to the extruded rod can be of various depths to the knurls, which in turn controls how much PVP powder (the hydrophilic polymeric material(s)) gets dumped onto the base material (extruded rods). It is part of the black roller, black because it has been anodized.

A KEYENCE® vision system or similar vision system is typically used in connection with the present systems to ensure that a minimum level of the hydrophobic water insoluble solid material (typically PVP alone or in combination with one or more of the other substances discussed above) is applied by measuring how white the material is leaving the manufacturing device. If there is not sufficient PVP or other powder material applied to the surface, the vision system will identify this state and notify the user of the production device(s) to stop the system and/or add more PVP or other hydrophobic water insoluble solid material(s) to the applicator or the funnel delivery system/hopper so that the hydrophobic water insoluble solid material(s) are available in adequate amounts.

What is claimed is:

1. An orthodontic protection device comprising:
   a rod of base material comprising at least one of the following compounds chosen from the group consisting of:
   a product consisting of one or more hydrocarbon-based waxes that may also include inorganic fillers and/or organic fillers;
   an uncured, uncross-linked silicone high consistency rubber base; and
   a hydrophobic water insoluble solid material that is malleable at 37° C. or lower and safe for a human oral environment; and wherein the rod of base material has at least one dry, powdered hydrophilic polymeric substance mechanically or frictionally engaged with and dispersed on one or more surface of the rod of base material thereby forming a finger force malleable hydrophobic base material composite configured to be applied to a surface of a tooth, a surface of an orthodontic appliance or both a surface of a tooth and a surface of an orthodontic appliance using finger pressure within about 8 seconds or less.

2. The orthodontic protection device of claim 1, wherein the rod of base material is an extruded rod comprising the uncured, uncross-linked silicone high consistency rubber base and the rod of base material is substantially cuboidal shaped.

3. The orthodontic protection device of claim 2, wherein the dry, powdered hydrophilic polymeric substance is chosen from the group consisting of: a polyvinylpyrrolidone, a polyoxazoline, a polyethylene glycol, a starch, a polyacrylic acid, a carbomer, a polyvinyl alcohol, a polyvinyl acetate, a cellulose derivative, a polysaccharide, a polyacrylamide, a N-vinyl caprolactam polymer, a copolymer of methyl vinyl ether and maleic anhydride (PVM/MA), and blends of any of the above.

4. The orthodontic protection device of claim 3, wherein the polysaccharide is a xanthan gum, a pectin, a guar gum, a starch, a cellulose ether, or a chitosan derivative.

5. The orthodontic protection device of claim 1, wherein the at least one dry, powdered hydrophilic polymeric substance comprises one or more water-soluble polymeric adhesive.

6. The orthodontic protection device of claim 1, wherein the rod of base material has a textured surface and the rod of base material having at least one dry, powdered hydrophilic polymeric substance mechanical engaged with and dispersed on the textured surface of the rod of base material.

7. The orthodontic protection device of claim 6, wherein the rod of base material has a dry, powdered hydrophilic polymeric substance on one surface thereof.

8. The orthodontic protection device of claim 1, wherein the at least one dry, powdered hydrophilic polymeric substance is mechanical engaged to only one surface of the rod of base material.

9. The orthodontic protection device of claim 1, wherein the device is at least substantially clear when applied to the surface of the tooth, the surface of the orthodontic device or the surface of the tooth and the surface of the orthodontic device in a buccal cavity.

10. The orthodontic protection device of claim 3, wherein the device is at least substantially clear when applied to the surface of the tooth, the surface of the orthodontic device or the surface of the tooth and the surface of the orthodontic device in a buccal cavity.

11. The orthodontic protection device of claim 10, wherein the device permanently contains a sufficient amount of the dry, powdered hydrophilic polymeric substance at the surface of the finger force malleable hydrophobic base material composite such that the orthodontic protection device is rendered adhesive in a substantially instantaneous fashion, upon pushing on with finger pressure to a tooth surface that is wet, a surface of an orthodontic brace that is wet, or a surface of a tooth and a surface of an orthodontic brace that are wet.

12. The orthodontic protection device of claim 11, wherein the orthodontic protection device, once applied to the tooth surface that is wet, the surface of the orthodontic brace that is wet, or the surface of the tooth and the surface of the orthodontic brace that are wet, stays adhered to teeth and orthodontic braces that are wet with saliva for at least eight hours unless removed by an outside force.

13. An orthodontic protection device comprising:
an extruded base material comprising at least one of the following compounds chosen from the group consisting of:
a product consisting of one or more hydrocarbon-based waxes that may also include inorganic or inorganic fillers;
an uncured, uncrosslinked silicone high consistency rubber base; and
a hydrophobic water insoluble solid material that is malleable at 37° C. or lower and safe for a human oral environment; and
wherein the extruded base material has at least one dry, powdered hydrophilic polymeric substance mechanically or frictionally engaged with and dispersed on a surface of the extruded base material thereby forming a finger force malleable hydrophobic base material composite configured to be applied to a surface of a tooth, a surface of an orthodontic appliance or both a surface of a tooth and a surface of an orthodontic appliance using finger pressure within about 8 seconds or less.

14. The orthodontic protection device of claim 13, wherein the orthodontic protection device, once applied to a tooth surface that is wet, a surface of an orthodontic brace that is wet, or a surface of a tooth and a surface of an orthodontic brace that are wet, stays adhered to teeth and orthodontic braces that are wet with saliva for at least eight hours unless removed by an outside force.

15. The orthodontic protection device of claim 14, wherein a sufficient amount of the dry, powdered hydrophilic polymeric substance at the surface of the finger force malleable hydrophobic base material composite such that the orthodontic protection device is rendered adhesive in a substantially instantaneous fashion, upon pushing on with finger pressure to the tooth surface that is wet, the surface of the orthodontic brace that is wet, or the surface of the tooth and the surface of the orthodontic brace that are wet.

16. The orthodontic protection device of claim 13, wherein the at least one dry, powdered hydrophilic polymeric substance is mechanically engaged with and at least substantially uniformly dispersed on at least 85% of the surface of the extruded base material that engages the surface of the tooth, the surface of the orthodontic appliance or both the surface of the tooth and the surface of the orthodontic appliance.

17. The orthodontic protection device of claim 13, wherein the at least one dry, powdered hydrophilic polymeric substance is dispersed over all of the surface of the extruded base material that engages the surface of the tooth, the surface of the orthodontic appliance or both the surface of the tooth and the surface of the orthodontic appliance.

18. The orthodontic protection device of claim 17, wherein the orthodontic protection device is at least substantially clear when applied to a tooth surface of a tooth, a surface of an orthodontic device or the surface of a tooth and the surface of an orthodontic device in a buccal cavity the device permanently contains a sufficient amount of the dry, powdered hydrophilic polymeric substance at the surface of the finger force malleable hydrophobic base material composite such that the orthodontic protection device is rendered adhesive in a substantially instantaneous fashion, upon pushing on with finger pressure to the tooth surface that is wet, the surface of the orthodontic device that is wet, or the surface of the tooth and the surface of the orthodontic device that is wet.

19. An orthodontic protection device comprising:
an extruded base material comprises an uncured, uncrosslinked silicone high consistency rubber base and wherein the extruded base material has at least one dry, powdered hydrophilic polymeric substance mechanically or frictionally engaged with and dispersed on a surface of the extruded base material thereby forming a finger force malleable hydrophobic base material composite configured to be applied to a surface of a tooth, a surface of an orthodontic appliance or both a surface of a tooth and a surface of an orthodontic appliance using finger pressure within about 8 seconds or less.

20. The orthodontic device of claim 19, wherein the orthodontic protection device, once applied to a tooth surface that is wet, the surface of the orthodontic appliance that is wet, or the surface of the tooth and the surface of the orthodontic appliance that are wet, stays adhered to teeth and orthodontic braces that are wet with saliva for at least eight hours unless removed by an outside force.

* * * * *